United States Patent Office 2,863,874
Patented Dec. 9, 1958

2,863,874

PROCESS OF PREPARING 2-AMINOTHIAZOLES

James T. Gregory, Akron, Ohio, assignor to The B. F. Goodrich Company, New York, N. Y., a corporation of New York No Drawing. Application May 26, 1955
Serial No. 511,423

10 Claims. (Cl. 260—306.8)

This invention relates to a novel chemical reaction between an alpha-thiocyano carbonyl compound and a primary amine or an acid salt thereof and is especially concerned with the synthesis, by this reaction, of 2-aminothiazoles. It is also concerned with certain novel compounds of this class which have considerable utility for diverse purposes including their use as accelerators and activators of the vulcanization of natural and synthetic rubbers and their use as intermediates in the preparation of other compounds such as the sulfathiazoles.

Many 2-aminothiazoles are well-known organic chemical compounds. Their usefulness as intermediates in the preparation of sulfathiazoles and their ability to accelerate and/or activate the vulcanization of rubbery materials are known to these arts. It is also known to the art that certain 2-aminothiazoles can be prepared by the chemical reaction of an alpha-halo ketone with thiourea or by the chemical reaction of an N-substituted thiourea with alpha, beta-dichloro diethyl ether.

However, I have now discovered that a novel chemical reaction between an enolizable alpha-thiocyano carbonyl compound and a primary amine or an acid salt thereof takes place in an acidic aqueous reaction medium at a temperature of from 50° to 110° C. and preferably at the reflux temperature of the reaction mixture to produce a product recoverable as a 2-aminothiazole. The reaction involves the thiocyano group and hydroxyl group of the enol form of the alpha-thiocyano carbonyl compound and a replaceable hydrogen of an amino group of the primary amine with water being split out and ring closure taking place. There is formed by this reaction a 2-aminothiazole containing the structure

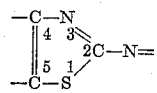

Represented graphically the reaction probably proceeds as follows:

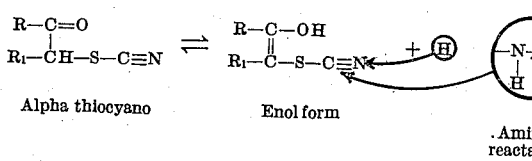

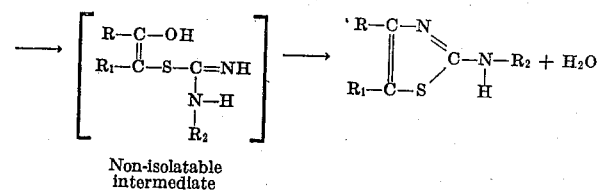

where R and $R_1$ represent the non-reactive residue of the alpha-thiocyano carbonyl compound and $R_2$ represents the non-reactive residue of the primary amine. In general R and $R_1$ are either hydrogen or a hydrocarbon radical containing 1 to 10 carbon atoms and $R_2$ is an organic group as hereinafter defined.

Certain of these 2-aminothiazoles, especially the 2-amino-4,5-substituted thiazoles, are new chemical compounds. The 2-amino-4,5-alkyl-substituted thiazoles, where R and $R_1$ in the general formula are alkyl radicals, are useful as pharmaceuticals in compositions employed in relaxing muscles.

The primary amino reactant need not be a mono-primary amine as in the above-illustrative reaction equation, for it is apparent that the amino reactant can possess any number of primary amino groups such as in the di-, tri-, tetra-, etc., primary amines and be successfully used as a reactant in the process of this invention. In such cases where the amino reactant contains more than one primary group, the reaction will require one mole of thiocyano carbonyl for each molar equivalent of primary amino group present.

In carrying out the reaction; i. e., in reacting the thiocyano carbonyl with the primary amino reactant in an acidic aqueous medium, several means of obtaining the desired reaction mixture can be employed. The reaction mixture can be prepared by admixing the thiocyano carbonyl and amino reactant with a dilute aqueous solution of a mineral acid. Alternatively, the reaction mixture can be prepared by adding to the water employed as the reaction diluent the desired quantity of acid as the acid salt of the amino reactant and then mixing the thiocyano carbonyl and the remainder of the amino reactant (as the free base) with the previously prepared aqueous portion. The reaction mixture can also be prepared by adding to a mixture of water and the thiocyano carbonyl all of the amino reactant in the form of an acid salt thereof. Another variation is to follow the last suggested preparation of the reaction mixture but add more acid to increase the molar proportion of acid to the amino group above one to one. Also an inert water miscible solvent can be added to the reaction mixture when the acid salt of the amino reactant is insoluble in water. In any case the primary amino reactant in the final reaction mixture will be neutralized to the extent possible by the acid present regardless of the quantity of acid employed. Thus the reaction mixture can be defined as corresponding to that produced by admixing the thiocyano carbonyl reactant and the primary amino reactant with a dilute aqueous solution of the mineral acid.

The quantity of mineral acid employed in the reaction mixture can be varied as desired, as indicated above. The reaction will take place when there are two or more moles of acid present for each molar equivalent of primary amino group present or when as little as 0.001 mole of acid is present for each molar equivalent of $NH_2$. The preferred quantity of mineral acid is from 0.001 to 0.5 mole per molar equivalent of $NH_2$ in the reaction mixture, for, as will be hereinafter demonstrated, the presence of more than the preferred concentration of acid tends to decrease the yield of the product desired.

The product resulting from the heating of the reaction mixture at reflux temperature depends on the basicity of the 2-aminothiazole. For example, where the 2-aminothiazole produced is sufficiently basic to form a salt with the acid present, the product will be an acid salt of the 2-aminothiazole providing there is sufficient acid present to neutralize all of the free base. When the preferred quantity of acid is employed, the product will contain both the free base and the acid salt if the salt forms. When the 2-aminothiazole is not sufficiently basic and does not react with the acid the free base is formed. The desired free base is recovered from the acid salt of the 2-aminothiazole whether it is in solution in the aqueous reaction medium or precipitated as a solid alone or in admixture with the free base merely by following the general practice in such cases, i. e., by reacting the acid salt with an alkaline material. Thus the product of the reaction is recoverable as a 2-aminothiazole.

Any mineral acid such as hydrochloric, sulfuric, phosphoric and other mineral acids can be employed in the process of this invention to prepare the dilute aqueous medium. The use of hydrochloric acid is preferred because it is least likely to enter into side reactions during the heating at reflux temperature.

For the purposes of this invention any enolizable alpha-thiocyanocarbonyl compound can be employed as a reactant. Such a compound will, of course, contain in the keto form, the structure

and will have only the one oxygen atom attached to the carbonyl carbon atom, that is, it will be an alpha thiocyano aldehyde or ketone. Ordinarily it will contain, in addition to the carbonyl oxygen atom and the nitrogen and sulfur atoms of the thiocyano group, only carbon and hydrogen atoms as when it possesses the structure

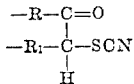

wherein R and $R_1$ are hydrogen or hydrocarbon groups; however, R and $R_1$ may also be radicals containing elements other than carbon and hydrogen present in nonreactive structure, as, for example, halogen replacing hydrogen in hydrocarbon groups, oxygen in ether linkages, sulfur in thio ether linkages, nitrogen and oxygen in nitro groups, oxygen in other carbonyl groups such as in the alpha-thiocyano keto acids and keto acid esters etc. All such alpha-thiocyano aldehydes and ketones are known types of compounds and can be readily prepared by known methods, for example, by the reaction of sodium thiocyanate with the appropriate alpha-halo aldehydes and ketones.

As examples of enolizable alpha-thiocyano carbonyl compounds which are suitable reactants for the process of this invention, there may be mentioned such alpha-thiocyano aldehydes as:

Thiocyano-acetaldehyde
Alpha-thiocyano-n-propionaldehyde
Alpha-thiocyano-n-butyraldehyde
Alpha-thiocyano-n-valeraldehyde
Alpha-isopropyl-alpha-thiocyano-acetaldehyde
Alpha-benzyl-alpha-thiocyano-acetaldehyde
Alpha-phenyl-alpha-thiocyano-acetaldehyde
Alpha-naphthyl-alpha-thiocyano-acetaldehyde
Alpha-cyclohexyl-alpha-thiocyano-acetaldehyde
Alpha-chloro-alpha-thiocyano-acetaldehyde
Alpha-thiocyano-alpha-ethoxy acetaldehyde
Alpha-thiocyano-beta-chlorobutyraldehyde, and
Alpha-thiocyano-beta-ethoxy butyraldehyde and such alpha-thiocyano ketones as for example:

1-thiocyano-propanone-2
3-thiocyano-butanone-2
3-thiocyano-pentanone-2
3-thiocyano-hexanone-2
3-thiocyano-heptanone-2
3-phenyl-3-thiocyano-propanone-2
3-cyclohexyl-3-thiocyano-propanone-2
4-phenyl-3-thiocyano-butanone-2
5-phenyl-3-thiocyano-pentanone-2
6-phenyl-3-thiocyano-hexanone-2
3-naphthyl-3-thiocyano-propanone-2
5-p-tolyl-3-thiocyano-pentanone-2
3-thiocyano-4-pentanone-2
2-thiocyano-pentanone-3
2-thiocyano-hexanone-3
1-thiocyano-hexanone-2
Alpha-thiocyano propionophenone
1-phenyl-3-thiocyano-butanone-2
1-phenyl-4-thiocyano-pentanone-3
Alpha-thiocyano propiononaphthone
4-thiocyano-hexanone-3
3-thiocyano-heptanone-4
2-thiocyano-octanone-3
Alpha-thiocyano pentanophenone
1-phenyl-3-thiocyano-pentanone-2
1-phenyl-4-thiocyano-hexanone-3
Alpha-thiocyano pentanonaphthone
5-thiocyano-1-heptenone-4
1-cyclohexyl-1-thiocyano-propanone-2
1-cyclohexyl-2-thiocyanopropanone
1-cyclohexyl-2-thiocyanobutanone
1-chloro-3-thiocyanobutanone-2
1-bromo-3-thiocyanobutanone-2
1,1-dichloro-3-thiocyanobutanone-2
1,4-dibromo-3-thiocyanobutanone-2
1-methoxy-3-thiocyanobutanone-2
1-(methyl-thio)-3-thiocyanobutanone-2
2-thiocyano-1-isopropoxy-butanone-3
2-thiocyano-1-(isopropyl-thio)-butanone-3
2-thiocyano-1-ethoxy-butanone-3
2-thiocyano-1-(ethyl-thio)-butanone-3
2-thiocyano-1-o-nitrophenyl-butanone-3
3-thiocyano-5-chloro-hexanone-2
2-thiocyano-1,5-diphenyl-6-nitrohexanone-3
3-thiocyano-1-butoxy-2-methylhexanone-4
4-thiocyano-1-ethyl-5-methylhexanone-3
2-thiocyano-cyclopentanone
2-thiocyano-cyclohexanone
2,5-di(thiocyano)-1,4-cyclohexanedione
2,3-di(thiocyano)-1,4-cyclohexanedione
2,3-di(thiocyano)-1,4-pentanedione
2,5-di(thiocyano)-1,6-decanedione
2-(alpha-thiocyanoacetonyl)-cyclohexanone
Alpha-thiocyano-beta-oxo-butyric acid; and
Methyl-alpha-thiocyano-beta-oxo-propionate Although any enolizable alpha-thiocyano compound containing the structure hereinbefore set forth can be employed as a reactant according to the process of this invention, alpha-thiocyano ketones, where R in the general formula hereinbefore appearing is a hydrocarbon group, are preferred as reactants because at the present they are more readily available.

The amino compound employed as the other reactant in the process of this invention can be any of the wide variety of primary amines available to the art. They may be employed as the free amine or in the form of an acid salt as noted above. Although unsubstituted primary amines (that is, amines composed exclusively of primary amino groups attached to hydrocarbon structures as in the structure $R_2$—$NH_2$ when $R_2$ is a hydrocarbon group) are ordinarily employed because of their lower cost, it will be understood that primary amines containing heterocyclic ring structures or substituent groups such as halogen atoms, nitro groups, ether and thioether groups and other hydrogen-free non-reactive groups, as well as primary amines containing hydroxyl, mercapto, carboxyl, sulfonic acid and other hydrogen-containing substituent groups can also be used. Specific primary amines having only hydrocarbon groups attached to the amino nitrogen include among others methyl amine, ethyl amine, n-propyl amine, isopropyl amine, n-butyl amine, isobutyl amine, sec. butyl amine, tert. butyl amine, 3-phenyl sec. butyl amine, mono-amyl amines, monohexyl amines, mono-heptyl amines, allyl amine, 2-methyl allyl amine, 3-phenyl allyl amine (cinnamylamine), cyclohexyl amine, cyclo-pentyl amine, aniline, toluidine, xylidine, mesidine, biphenyl amine, naphthyl amines, benzyl amine, phenethyl amine, naphthylene-methyl amines, as well as such substituted amines as, 2-furanamine, furfurylamine, 2-p-dioxamine, 3-gamma-pyranylamine, 2-amino-pyridine, 4-amino-pyridine, 2-aminothiazole, 2-amino-alpha-methyl-4-phenyl-5-thiazole acetic acid, 2-amino-4-p-tolyl-5 thiazole acetic acid, 3-thiophenine, 4-(aminobutyl)-piperidine, 4-(aminobutyl) pyridine, 2,2-diethoxy ethyl amine, 3-benzyloxy propyl amine, 3-butoxy propylamine, 3-ethoxy propylamine, 3-(2-ethyl-hexyloxy) propylamine, 3-isopropoxy propylamine, 3-methoxy propylamine, 3-methoxy-ethoxy propylamine, 3-octadecyloxy propylamine, 3-propoxy propylamine, 3-isoamoxy cyclohexylamine, 4-isoamoxy cyclohexylamine, 2,2'-dithiobisethylamine, o-amino-phenyl mercaptan, 2-amino-4-chlorophenyl mercaptan, 1,1-dichloromethyl amine, 2-chlorobutyl amine, 3-chloropropyl amine, alpha-bromobutyl amine, beta-bromobutyl amine, 3-bromocyclohexylamine, 4-bromocyclohexylamine, 2-iodo cyclohexylamine, ethanolamine, 2-aminocyclohexanol, 4-aminocyclohexanol, 2-amino-4-methylcyclohexanol, 8-amino-octanol, 7-amino-3-heptanol, 2-amino-1-phenyl-octanol, 5-amino-2,7-dimethyl-4-octanol, beta-amino ethyl mercaptan, 3-amino-2-hydroxy propane sulfonic acid, 4-amino-naphthoic acid, naphthionic acid, nitro anilines, nitro naphthylamines, 4-nitrophenylene diamine, nitrotoluidines, nitronaphthylamines, amino benzoic acid, metanilic acid, ethylene diamine, phenylenediamine, 1,2-propanediamine, 3,3'-diphenyldiamine and 1,2,4-butane triamine.

The following specific examples will more fully describe the method of preparing the 2-aminothiazoles according to this invention. Throughout the examples the term "parts" is employed to indicate parts by weight.

EXAMPLE I

A mixture consisting of 9.3 parts (0.1 mole) of aniline, 12.9 parts (0.1 mole) of 3-thiocyano-butanone-2 and 110 parts of an aqueous HCl solution containing 3.3% HCl (0.1 mole HCl) in a reactor was stirred and heated to reflux at about 100° C. The reaction mixture was vigorously stirred for two hours while maintained at a temperature of about 100° C. A clear solution formed, from which precipitated, on seeding a copious white precipitate. The precipitate was recovered by filtration and dried. There was recovered 20.8 parts, a 85.6% yield, of a product melting at 115–117° C. This product when neutralized to the free base had the identical melting point (107 to 109.5° C.) and ultra violet spectrum of authentic 2-anilino-4,5-dimethylthiazole, and a mixture of this free base with pure 2-anilino-4,5-dimethyl thiazole had a melting point identical with the pure compound. Therefore the product of this preparation was 2-anilino-4,5-dimethylthiazole hydrochloride which yields the free base 2-anilino-4,5-dimethylthiazole when treated with an alkaline material.

EXAMPLE II

Example I was repeated except that 102 parts of an aqueous solution of HCl containing about 0.01 mole of HCl was employed. In this preparation 18 parts, an 88% yield, of 2-anilino-4,5-dimethylthiazole hydrochloride was recovered. This material when purified by recrystallization from benzene and neutralized had a melting point of 107 to 109.5° C.

EXAMPLE III

Example I was repeated except that there was present 0.15 mole of HCl. The yield of 2-anilino-4,5-dimethylthiazole hydrochloride was only 60%.

EXAMPLE IV

Example I was repeated except that 100 parts of water was substituted for the aqueous solution of HCl. In this case no product was obtained.

The above four examples demonstrate that the presence of the mineral acid is critical and that an amount of acid in excess of the preferred quantity adversely effects the yield of aminothiazole.

The following are examples of the preparation of other 2-aminothiazoles employing various amines and thiocyano carbonyls.

EXAMPLE V

A mixture consisting of 27 parts of methylamine hydrochloride, 51.6 parts of 3-thiocyanobutanone-2 and 100 parts of water was heated to maintain reflux and stirred vigorously for 7.5 hours until the original two phase system became homogeneous. The resulting aqueous mixture was evaporated to one-half of its volume and then cooled to 0° C. before the product crystallized out. Even then only 8.4 parts of product was recovered. This material was identified as 2-methylamino-4,5-dimethylthiazole hydrochloride which had a melting point of 281° to 284° C. The filtrate (mother liquor) was neutralized with sodium carbonate and 37 parts of a solid precipitated which was recovered. This precipitated solid, after being recrystallized from benzene, had a melting point of 125° to 128° C. and was identified as 2-methylamino-4,5-dimethylthiazole. The overall yield of the purified free base was 77%.

EXAMPLE VI

To prepare N,N'-[(2)4,5-dimethylthiazyl]ethylene diamine, a mixture consisting of 18 parts of ethylene diamine, 78 parts of 3-thiocyanobutanone-2, 79 parts of ethanol and 300 parts of an aqueous solution containing 12 parts of HCl was refluxed and stirred for 6 hours. The resulting clear solution was neutralized with sodium carbonate and a solid precipitated. In this manner there was obtained 75 parts, an 88.5% yield, of a solid having a melting point of 215° to 217° C. and having the following chemical composition which is in agreement with the composition for the desired compound.

*Chemical composition*

| Compound Prepared | N,N'-[(2) 4,5-dimethylthiazyl] ethylene diamine |
|---|---|
| Percent C, 50.97 | Percent C, 51.03 |
| Percent H, 6.48 | Percent H, 6.42 |
| Percent N, 19.77 | Percent N, 19.84 |
| Percent S, 22.66 | Percent S, 22.70 |

The free base prepared has the formula

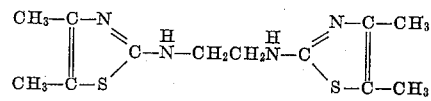

EXAMPLE VII

To prepare 2-(p-tertiary amyl anilino) 4,5-dimethylthiazole there was heated to reflux a mixture consisting of 41 parts of p-tertiary amyl aniline, 32.5 parts of 3-thiocyanobutanone-2, 79 parts of ethanol and 125 parts of an aqueous solution containing 9.25 parts of HCl. This mixture was refluxed and stirred for 9 hours. When the alcohol was removed by distillation, a solid material precipitated from the aqueous medium in the still.

This solid was recovered and dissolved in 200 parts of hot water. The resulting solution was neutralized with sodium hydroxide and a solid material precipitated. This solid material when recrystallized from benzene had a melting point of 123.5° to 125.5° C. and had the following chemical composition which is in agreement with the desired product, 2-(p-tertiary amyl anilino) 4,5-dimethylthiazole.

Chemical composition

| Compound Prepared | 2-(p-tertiary amyl anilino) 4,5-dimethylthiazole |
|---|---|
| Percent C, 70.27 | Percent C, 70.03 |
| Percent H, 8.04 | Percent H, 8.08 |
| Percent N, 10.25 | Percent N, 10.21 |
| Percent S, 11.59 | Percent S, 11.68 |

EXAMPLE VIII

A mixture consisting of 35.75 parts of beta-naphthylamine, 32.25 parts of 3-thiocyanobutanone-2, 79 parts of ethanol, and 225 parts of an aqueous solution containing 9 parts of HCl was heated to reflux. This mixture was stirred and refluxed for 10 hours. The ethanol was distilled off and the remaining aqueous solution was neutralized with sodium hydroxide. In this manner 60 parts, a 94.5% yield, of a product which when recrystallized from benzene had a melting point of 140.5° to 142.5° C. The chemical analysis of this compound is in agreement with that of 2-beta-naphthylamino-4,5-dimethylthiazole as is indicated below.

*Chemical composition*

| Compound Prepared | 2-beta-naphthyl-amino-4,5-dimethyl thiazole |
|---|---|
| Percent C, 70.88 | Percent C, 70.83 |
| Percent H, 5.66 | Percent H, 5.55 |
| Percent N, 10.95 | Percent N, 11.02 |
| Percent S, 12.54 | Percent S, 12.61 |

EXAMPLE IX 2-(p-carboxyphenyl) amino-4,5-dimethyl thiazole was prepared by heating to reflux with stirring for 10 hours a mixture consisting of 34.25 parts of p-amino benzoic acid, 32.25 parts of 3-thiocyanobutanone-2, 79 parts of ethanol, and 225 parts of an aqueous solution containing 9 parts of HCl. At the end of this reaction time a precipitate had formed which was recovered by filtration. The precipitate was found to contain no halogen and hence it was not in the form of an amine hydrochloride. The filtrate was neutralized with sodium hydroxide and more solid precipitated indicating that part of the product formed as the hydrochloride salt. In all 55.7 parts, a yield of 90%, of solid was recovered which when purified by digesting in ethylene glycol dimethyl ether and recrystallizing from formamide had a melting point of 325° to 326° C. This compound had a sulfur content of 12.90% which is in agreement with the calculated sulfur content, 12.91%, for 2-(p-carboxyphenyl) amino-4,5-dimethyl thiazole. The free base prepared has the formula

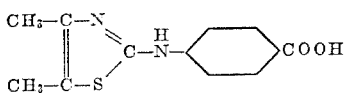

EXAMPLE X 2-hydroxy-5-[N(2)-4,5-dimethylthiazylamino] benzoic acid (that is, 2-(p-hydroxy m-carboxyphenyl) amino-4,5-dimethyl thiazole), was prepared by stirring and heating at reflux for 8 hours a mixture comprising 38 parts of 5-amino-salicylic acid hydrochloride, 25.8 parts of 3-thiocyanobutanone-2, 79 parts of ethanol, and 300 parts of water. At the end of this reaction time a grey precipitate was present in the reactor. This precipitate was recovered by filtration and dried. There was recovered 41.5 parts of dry product which melted at 277° to 278° C. and contained no halogen. This crude product was purified by dissolving it in hot dilute aqueous HCl solution and reprecipitating the purified product by quenching and diluting with cold water. The purified product melted at 286° to 287° C. with decomposition and gas evolution and was found to have a sulfur content of 12.11% while the desired product has a calculated sulfur content of 12.13%. This product has the formula

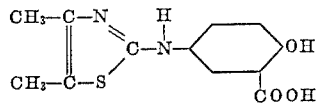

EXAMPLE XI m-(2-amino-4,5-dimethylthiazyl) benzene sulfonic acid was prepared by stirring and heating at reflux for 13 hours 43.25 parts of m-amino benzene sulfonic acid, 32.25 parts of 3-thiocyanobutanone-2, 79 parts of ethanol, and 225 parts of an aqueous solution containing 9 parts of HCl. At the end of this reaction period, the alcohol was removed by distillation, and the remaining aqueous mixture was cooled. On cooling the aqueous mixture, a precipitate formed. There was recovered 50.6 parts of this product which melted at 358° C. with decomposition. After being purified by recrystallization from a dilute aqueous solution of HCl, the resulting product melted at 362° C. with decomposition. This product was found to contain 9.86% nitrogen and 22.53% sulfur which is in agreement with 9.85% nitrogen and 22.55% sulfur calculated for the desired product.

EXAMPLE XII 2-ethylamino-4,5-dimethylthiazole was prepared by stirring and heating at reflux for 13 hours a mixture containing 16.3 parts of ethylamine hydrochloride, 25.3 parts of 3 thiocyanobutanone-2, 40 parts of ethanol, and 200 parts of water. At the end of this reaction period the resulting mixture was neutralized with sodium hydroxide and the product precipitated as a solid. The product was recovered by filtration and dried. There was recovered 15.1 parts of the dried product having a melting point of 72° to 75° C.

EXAMPLE XIII

There was stirred and heated at reflux for 9 hours a mixture consisting of 42.2 parts of p-(alpha-phenylisopropyl) aniline, 25.8 parts of a mixture containing 3-thiocyanobutanone-2 and 1-thiocyanobutanone-2 (obtained by reacting commercially available chlorobutanone with an inorganic thiocyanate), 79 parts of ethanol, and 221 parts of an aqueous solution containing 8.0 parts of HCl. After this reaction period the ethanol was removed by distillation and two liquid layers formed. There was added to this two phase system 87 parts of benzene and the benzene layer was recovered. The benzene solution was washed twice with water and then charged to a vacuum still where the benzene was distilled off at reduced pressure. A liquid product remained in the still pot. There was recovered 67 parts of a liquid which contained 2-(p-alpha-phenylisopropylanilino) 4,5-dimethyl thiazole which has the formula

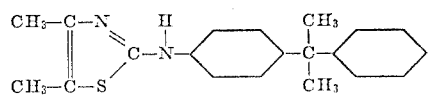

and 2-(p-alpha-phenylisopropylanilino) - 4 - ethylthiazole which has the formula

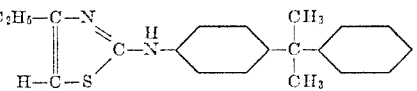

The yield is slightly in excess of 100% because of incomplete removal of water and benzene.

EXAMPLE XIV

A mixture containing 2-(p-alphaphenylethylanilino)-4,5-dimethylthiazole,

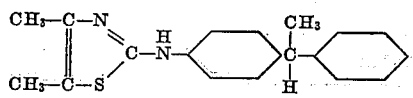

and 2-p-alphaphenylethylanilino)-4-ethylthiazole,

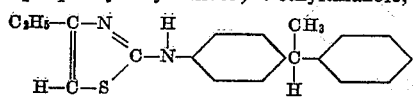

was prepared by stirring and heating at reflux for 9 hours 39.4 parts of p-(alpha-phenylaniline), 25.8 parts of the mixture of thiocyanobutanones of Example XIII, 79 parts of ethanol, and 221 parts of an aqueous solution containing 8.0 parts of HCl. After this reaction period the ethanol was removed by distillation and a crystalline material precipitated. This solid was recovered by filtration. The filtrate was concentrated by evaporation and more solid precipitated. In all 72 parts of this solid product were recovered.

EXAMPLE XV 3-thiocyanobutanone-2 and 6-amino-2-mercaptobenzothiazole were heated to reflux in the presence of a dilute aqueous solution of HCl. A solid product melting at 172–185° C. with decomposition was recovered in a yield of 82%. This solid was identified as N-[(2)-4,5-dimethylthiazyl]-6-amino-2-mercaptobenzothiazole hydrochloride. This solid product was neutralized with an aqueous solution of sodium hydroxide and the resulting free secondary amine recovered had a melting point of 227° to 230° C. This compound is believed to be N-[(2)-4,5 - dimethylthiazyl] - 6 - amino - 2 - mercaptobenzothiazole which would have the formula

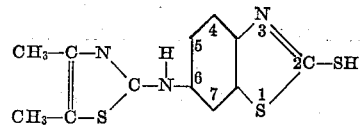

In the following examples the details of the preparation of each compound are omitted. Instead there are tabulated the reactants necessary to produce each compound. Since the examples hereinbefore appearing illustrated the use of a great variety of amino reactants, the following examples will be confined to the use of only one amine, aniline, but will however, illustrate the use of a variety of enolizable thiocyano carbonyl reactants.

EXAMPLES XVI TO XXV

*The products obtainable by reacting aniline with various enolizable thiocyano carbonyls in presence of aqueous medium containing a small amount of mineral acid*

| Ex. No. | Thiocyano Carbonyl Reactant | Recoverable Product |
|---------|------------------------------|---------------------|
| XVI | Thiocyano acetaldehyde | 2-anilino thiazole |
| XVII | Alpha thiocyano propionaldehyde $CH_3-CHC=O$ / $SCN$ $H$ | 2-anilino-5-methylthiazole |
| XVIII | 2-Isopropyl-2-thiocyano acetaldehyde $CH_3-CH-CH-C=O$ / $SCN$ / $CH_3$ $H$ | 2-anilino-5-isopropylthiazole |
| XIX | 2-Phenyl-2-thiocyano acetaldehyde $\bigcirc-CHCHO$ / $SCN$ | 2-anilino-5-phenylthiazole |
| XX | 4-Phenyl-3-thiocyanobutanone-2 $\bigcirc-CH_2-CH-C=O$ / $SCN$ $CH_3$ | 2-anilino-4-methyl-5-benzylthiazole |
| XXI | 2-Thiocyanoheptanone-3 | 2-anilino-4-n-butyl-5-methylthiazole |
| XXII | Alpha-thiocyano propiono phenone $CH_3-CH-C(=O)-\bigcirc$ / $SCN$ | 2-anilino-4-methyl-5-phenylthiazole |

EXAMPLES XVI TO XXV—Continued

*The products obtainable by reacting aniline with various enolizable thiocyano carbonyls in presence of aqueous medium containing a small amount of mineral acid*

| Ex. No. | Thiocyano Carbonyl Reactant | Recoverable Product |
|---|---|---|
| XXIII | 3-Thiocyano-octanone-4<br><br>$C_3H_7-CH-\underset{\underset{SCN}{\|}}{C}-C_4H_9$<br>$\phantom{xxxxxx}\|\|$<br>$\phantom{xxxxxxx}O$ | $\begin{array}{c}C_4H_9-C-N\\ \phantom{xx}\|\|\phantom{xx}\diagdown\\ C_2H_5-C-S\end{array}\phantom{x}\begin{array}{c}H\\ \|\\ C-N-\langle\phantom{xx}\rangle\end{array}$<br>2-anilino-4-n-butyl-5-ethylthiazole |
| XXIV | 3-Thiocyano-1-heptenone-4<br><br>$C_2H_5-\overset{O}{\overset{\|\|}{C}}-\underset{\underset{SCN}{\|}}{C}-CH_2-CH=CH_2$ | $\begin{array}{c}CH_2=CH-CH_2-C-N\\ \phantom{xxxxxxxxxxx}\|\|\phantom{xx}\diagdown\\ \phantom{xxxxxxxx}C_2H_5-C-S\end{array}\phantom{x}\begin{array}{c}H\\ \|\\ C-N-\langle\phantom{xx}\rangle\end{array}$<br>2-anilino-4-allyl-5-ethylthiazole |
| XXV | 3-Thiocyano-5-hexenone-2<br><br>$CH_2=CH-CH_2-\underset{\underset{SCN}{\|}}{CH}-\overset{O}{\overset{\|\|}{C}}-CH_3$ | $\begin{array}{c}CH_3-C-N\\ \phantom{xx}\|\|\phantom{xx}\diagdown\\ CH_2=CH-CH_2-C-S\end{array}\phantom{x}\begin{array}{c}H\\ \|\\ C-N-\langle\phantom{xx}\rangle\end{array}$<br>2-anilino-4-methyl-5-allylthiazole |

EXAMPLE XXVI

A mixture was prepared containing 25.8 parts of 3-thiocyanobutanone, 26 parts of N,N-diethylaminopropylamine, 200 ml. of water, 50 ml. of ethanol, and 34 ml. of concentrated hydrochloric acid. This mixture was heated at reflux (about 100° C.) for 7 hours. The ethanol was removed by distillation and the acidic water solution was extracted with benzene to remove any unreacted thiocyanobutanone. Neutralization of the water solution with sodium hydroxide formed a brownish oily phase which was separated from the aqueous phase. The latter was extracted with chloroform and added to the oil. The chloroform was removed by distillation. The oily material was purified by distillation at 0.2 mm. pressure 23 parts of purified product a liquid at room temperature, were collected as a light yellow oil with a B. P. at 0.2 mm. of 113–116° C. It had a maximum absorption band at 324 Angstrom units. The picrate salt was an orange solid which melted at 133–136° C. The following analytical data were obtained.

| | C | H | N | S |
|---|---|---|---|---|
| Calculated for $C_{12}H_{23}N_3S.C_6H_3N_3O_7$ | 45.94 | 5.57 | 17.86 | 6.82 |
| Found | 46.09 | 5.58 | 17.81 | 6.62 |

On the basis of these data the following structure is assigned to the substituted amino thiazole

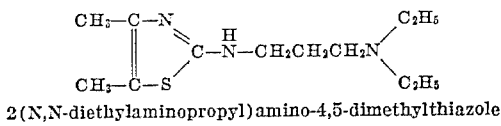

2(N,N-diethylaminopropyl)amino-4,5-dimethylthiazole

EXAMPLE XXVII

In this example an equivalent amount of

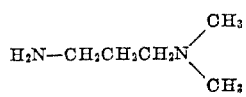

was substituted for $H_2N-(CH_2)_3N-(C_2H_5)_2$ but otherwise the reaction ingredients, proportions and conditions were the same as those described for Example XXVI. The end product was recovered as a light yellow oil, B. P. 115–121° C. at 0.8 mm. in a 50% yield. The picrate after recrystallization from ethanol melted at 168–171° C.

| | C | H | N | S |
|---|---|---|---|---|
| Calculated for $C_{10}H_{19}N_3S.C_6H_3N_3O_7$ | 43.43 | 5.01 | 18.99 | 7.25 |
| Found | 43.54 | 5.03 | 18.86 | 7.20 |

This compound had the structure

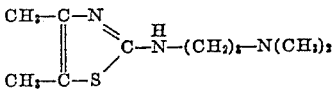

The compound of this example and that of Example XXVI have antihistamine properties.

EXAMPLE XXVIII

Equivalent proportions of 3-methoxypropylamine were substituted for the $H_2N(CH_2)_3N(C_2H_5)_2$ of Example XXVI. Otherwise the reaction conditions, proportions and reaction ingredients were the same as those recited in Example XXVI. The end-product recovered in a 40% yield was a light yellow liquid with a B. P. at 0.2 mm. of 102–4° C. It forms a solid hydrochloride in an ethanol HCl mixture. The hydrochloride had a M. P. of 111.5–116.5° C. A yellow picrate after recrystallization from ethanol had a M. P. of 157–159.5° C.

| Analysis of Picrate | C | H | N | S |
|---|---|---|---|---|
| Calculated for $C_9H_{16}N_2OS.C_6H_3N_3O_7$ | 41.95 | 4.46 | 16.31 | 7.47 |
| Found | 42.16 | 4.51 | 16.16 | 7.31 |

The thiazole derivative had the structure

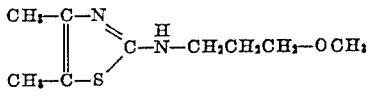

EXAMPLE XXIX

An equivalent quantity of

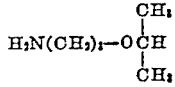

was substituted for the 3-methoxypropylamine of Example XXVIII. The reaction conditions, ingredients and proportions were otherwise the same as those described in Example XXVI. The end product, recovered in a 50.3% yield, was a light yellow liquid with a B. P. at 0.6 mm. of 113–117° C. On standing at room temperature the liquid solidified. This solid had a M. P. of 43–49° C. The oily aminothiazole formed a yellow picrate which melted at 111–114° C. after recrystallization from ethanol.

| Analysis of Picrate | C | H | N | S |
|---|---|---|---|---|
| Calculated for C₁₁H₂₀N₂OS.C₆H₃N₃O₇ | 44.63 | 5.07 | 15.31 | 7.01 |
| Found | 44.57 | 5.03 | 15.32 | 6.88 |

The aminothiazole has the structure

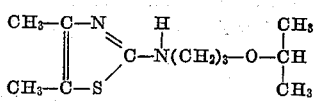

This application is a continuation-in-part of my co-pending application Serial No. 251,995, filed October 18, 1951, now abandoned.

Other members of the amino reactants and the alpha-thiocyano carbonyl reactants hereinbefore defined can also be employed in the novel process of this invention to produce products recoverable as 2-aminothiazoles.

Although I have illustrated my invention by means of specific examples, I do not thereby desire or intend to limit myself solely thereto, for as hitherto stated other equivalent compounds can be employed as reactants to prepare other specific products recoverable as 2-aminothiazoles and the precise proportions of the reactants as well as the other ingredients of the acidic aqueous reaction medium can be varied, if desired, without departing from the spirit and scope of this invention as defined in the appended claims.

I claim:

1. The method which comprises preparing a reaction mixture of an unsubstituted alpha-thiocyano carbonyl compound having from 3 to 13 carbon atoms and a primary amine having from 1 to 15 carbon atoms and having the elements C, H and N in the proportions of one mole of the thiocyano carbonyl compound for each primary amino group present in said amine, with a dilute aqueous solution containing from 0.001 to 2.0 moles of a mineral acid per molar equivalent of primary amino group present, the said amine in the reaction mixture being neutralized to the extent possible by the said mineral acid, and heating the aqueous reaction mixture to a temperature of from 50° to 110° C. for a substantial time interval thereby to form by chemical reaction a product recoverable as a thiazole having a nitrogen atom of the primary amine attached to the carbon atom in the 2-position of the thiazole nucleus.

2. The method which comprises preparing a reaction mixture of substantially equimolecular portions of an unsubstituted aliphatic alpha-thiocyano carbonyl compound having from 3 to 13 carbon atoms and a mono primary amine having from 1 to 15 carbon atoms and having the elements C, H and N with a dilute aqueous solution containing from 0.001 to 2.0 moles of a mineral acid per mole of amine, the said amine in the reaction mixture being neutralized to the extent possible by the said mineral acid, and heating the aqueous reaction mixture to a temperature of from 50° to 110° C. for a substantial time interval thereby to form by chemical reaction a product recoverable as a thiazole having a nitrogen atom of the primary amine attached to the carbon atom in the 2-position of the thiazole nucleus.

3. The method which comprises preparing a reaction mixture of substantially equimolecular portions of an unsubstituted alpha-thiocyano carbonyl compound having from 3 to 13 carbon atoms and a mono primary amine having from 1 to 15 carbon atoms and having the elements C, H and N with a dilute aqueous solution containing from 0.001 to 2.0 moles of hydrogen chloride per mole of amine, the said amine in the reaction mixture being neutralized to the extent possible by the hydrogen chloride, and heating the aqueous reaction mixture to a temperature of from 50° to 110° C. for a substantial time interval thereby to form by chemical reaction a product recoverable as a thiazole having a nitrogen atom of the primary amine attached to the carbon atom in the 2-position of the thiazole nucleus.

4. The method which comprises preparing a reaction mixture of substantially equimolecular portions of 3-thiocyano butanone-2 and a mono primary amine having from 1 to 15 carbon atoms and having the elements C, H and N with a dilute aqueous solution containing from 0.001 to 2.0 moles of hydrogen chloride per mole of amine, the said amine in the reaction mixture being neutralized to the extent possible by the hydrogen chloride, and heating the aqueous reaction mixture to reflux temperature for a substantial time interval thereby to form by chemical reaction a product recoverable as a 4,5-dimethylthiazole having the nitrogen atom of the primary amine attached to the carbon atom in the 2-position of the thiazole nucleus.

5. The method which comprises preparing a reaction mixture of substantially equimolecular portions of 3-thiocyano-butanone-2 and aniline with a dilute aqueous solution containing from 0.001 to about 0.5 mole of hydrogen chloride per mole of aniline, the aniline in the reaction mixture being neutralized to the extent possible by the hydrogen chloride, and heating the aqueous reaction mixture to reflux temperature for a substantial time interval thereby to form by chemical reaction a product recoverable as 2-anilino-4,5-dimethylthiazole.

6. The method which comprises preparing a reaction mixture of substantially equimolecular portions of 3-thiocyano-butanone-2 and methyl amine with a dilute aqueous solution containing 0.001 to 2.0 moles of hydrogen chloride per mole of the amine, said amine in the reaction mixture being neutralized to the extent possible by the hydrogen chloride, and heating the aqueous reaction mixture to reflux temperature for a substantial time interval thereby to form by chemical reaction a product recoverable as 2-methylamino-4,5-dimethylthiazole.

7. The method which comprises preparing a reaction mixture of 3-thiocyanobutanone-2 and ethylene diamine in the proportions of two moles of ethylene diamine for each mole of thiocyanobutanone, with a dilute aqueous solution containing 0.001 to 2.0 moles of hydrogen chloride per molar equivalent of amino group present in the reaction mixture, the ethylene diamine in the reaction mixture being neutralized to the extent possible by the hydrogen chloride, and heating the aqueous reaction mixture to reflux temperature for a substantial time interval thereby to form by chemical reaction a product recoverable as N,N'-[(2)4,5-dimethylthiazyl] ethylene diamine having the formula

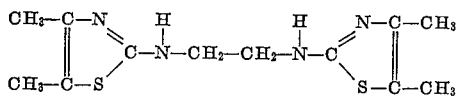

8. The method which comprises preparing a reaction mixture of substantially equimolecular portions of 3-thiocyanobutanone-2 and p-amino benzoic acid with a dilute aqueous solution containing from 0.001 to 2.0 moles of hydrogen chloride per mole of the amino acid, the amino benzoic acid in the reaction mixture being neutralized to the extent possible by the hydrogen chloride, and heating the aqueous reaction mixture to reflux temperature for a substantial time interval thereby to form by chemical reaction a product recoverable as 2-(p-carboxyphenyl) amino-4,5-dimethylthiazole.

9. The method which comprises preparing a reaction mixture of 3-thiocyanobutanone-2 and 5-aminosalicylic acid in substantially equimolecular portions with a dilute aqueous solution containing from 0.001 to 2.0 moles of hydrogen chloride per mole of the amino acid, the amino acid in the reaction mixture being neutralized to the extent possible by the hydrogen chloride, and heating in the aqueous medium reaction mixture to reflux temperature for a substantial time interval thereby to form by chemical reaction a product recoverable as 2-(p-hydroxy-m-carboxyphenyl) amino-4,5-dimethylthiazole which has the formula

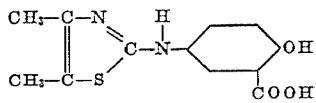

10. A method of preparing 2-aminosubstituted thiazoles comprising reacting a compound having the structure

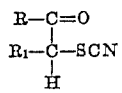

wherein R and $R_1$ is each selected from the class consisting of hydrogen and aliphatic hydrocarbon radicals having from 1 to 5 carbon atoms, a phenyl group and phenyl substituted lower alkyl groups, with a primary amine having from 1 to 2 primary amino groups selected from the class consisting of unsubstituted primary amines and substituted derivatives thereof in which the substituent is a member of the class consisting of carboxy, hydroxy, lower alkoxy, phenyl sulfonic acid and dilower alkyl tertiary amino groups, said primary amine having from 1 to 15 carbon atoms said reaction being carried out at a temperature of from about 50° C. to about 110° C. in the presence of water and from 0.001 to about 2.0 moles of mineral acid for each primary amino group, and continuing the reaction until a 2-aminosubstituted thiazole is formed.

References Cited in the file of this patent

UNITED STATES PATENTS

| | | |
|---|---|---|
| 2,339,314 | Zerweck et al. | Jan. 18, 1944 |
| 2,502,151 | Horclois | Mar. 28, 1950 |
| 2,626,949 | Gregory | Jan. 27, 1953 |

OTHER REFERENCES

Sprague et al.: Chem. Abstracts, vol. 35, col. 2144 (1941).

Arapides et al.: Liebig's Ann., vol. 249, pp. 7–53 (1888).

Hantzsch: Ber. Deut. Chem., vol. 61, pp. 1776–80 (1928).

Hunter et al.: Chem. Abstracts, vol. 28, col. 6438 (1934).

Erlenmeyer: Helv. Chim. Acta, vol. 31, pp. 1143–4 (1948).

Elderfield: "Heterocyclic Compd's," vol. 5, p. 577 (1957).

UNITED STATES PATENT OFFICE

CERTIFICATE OF CORRECTION

Patent No. 2,863,874                                    December 9, 1958

James T. Gregory

It is hereby certified that error appears in the printed specification of the above numbered patent requiring correction and that the said Letters Patent should read as corrected below.

Column 9, line 9, for "2-p-alphaphenylethylanilino)-4-ethylthiazole," read -- 2-(p-alphaphenylethylanilino)-4-ethylthiazole, --; column 16, line 2, for "110°" read 100° --.

Signed and sealed this 26th day of May 1959.

(SEAL)
Attest:

KARL H. AXLINE                                                 ROBERT C. WATSON
Attesting Officer                                            Commissioner of Patents